(12) United States Patent  
Kelly

(10) Patent No.: US 6,899,056 B1
(45) Date of Patent: May 31, 2005

(54) SEED DISPERSING APPARATUS

(76) Inventor: Michael A. Kelly, P.O. Box 149, Fairfield, CA (US) 94533

( * ) Notice: Subject to any disclaimer, the term of this patent is extended or adjusted under 35 U.S.C. 154(b) by 0 days.

(21) Appl. No.: 10/672,881

(22) Filed: Sep. 26, 2003

(51) Int. Cl.[7] .............................................. A01K 5/00
(52) U.S. Cl. ................ 119/51.01; 119/51.04; 119/230
(58) Field of Search .................... 119/51.01, 54.04, 119/73, 226, 230

(56) References Cited

U.S. PATENT DOCUMENTS

| | | | |
|---|---|---|---|
| 742,414 A | * | 10/1903 | Hale ....................... 119/51.04 |
| 3,741,163 A | | 6/1973 | Bush |
| 3,778,976 A | * | 12/1973 | Pond ........................... 96/181 |
| 4,235,198 A | | 11/1980 | Goguel |
| 4,372,252 A | | 2/1983 | Lowry, Jr. |
| 4,632,284 A | | 12/1986 | Erazo et al. |
| 4,967,697 A | | 11/1990 | Lau |
| 5,140,943 A | | 8/1992 | Nearhoff |
| 5,143,020 A | | 9/1992 | Patrick |
| 5,791,285 A | | 8/1998 | Johnson |
| 5,975,021 A | | 11/1999 | Shingleton et al. |
| 6,109,210 A | | 8/2000 | Nasser |

FOREIGN PATENT DOCUMENTS

JP         06153739 A   *   6/1994   .......... A01K 61/02

* cited by examiner

Primary Examiner—Teri Pham Luu
Assistant Examiner—Kimberly S. Smith
(74) Attorney, Agent, or Firm—Theodore J. Bielen, Jr.

(57) ABSTRACT

An apparatus for transporting animal feed in an aqueous body utilizing a container having a wall portion forming a chamber. The chamber is intended to hold the animal feed. A baffle is positioned in the chamber of the container to direct the animal feed to a selected portion of the chamber. A conduit and pump urge the movement of the animal feed and aqueous material from the chamber for dispersion as needed.

10 Claims, 2 Drawing Sheets

SEED DISPERSING APPARATUS

BACKGROUND OF THE INVENTION

The present invention relates to a novel and useful apparatus for transporting animal feed in an aqueous body.

The delivery of animal feed to wildlife requires the movement of animal feed along various distances from the source. With waterfowl, the delivery of feed has often entailed the use of watercraft or has required the animal feed to be manually delivered by a person. The latter requires a great deal of effort to carry and spread the animal feed at a selected area remote from storage buildings and other edifices.

In the past, many systems have been devised for distributing animal feed. For example, U.S. Pat. Nos. 5,140,943, 5,791,285, and 6,109,210 show fish feeding apparatuses in which a food holder is placed in a fish tank and water is caused to flow in order to carry the feed into the vicinity of the feeding fish.

U.S. Pat. Nos. 4,235,198, 4,967,697, and 5,143,020 show solid material dispensers which may be used to disperse fish feed or fertilizer in outdoor ponds. The devices include floating containers which are fixed to an area of the pond.

U.S. Pat. Nos. 4,632,284 and 5,975,021 describe seed dispensing devices that propel seed through an auger mechanism or a centrifugal propeller. The dispersed seed may be employed for farming purposes or to feed fish.

U.S. Pat. No. 4,372,252 describes a floating fish feeder in which a hopper is employed to hold feed. A pump combines the feed with water and sends the same through a conduit for use.

U.S. Pat. No. 3,741,163 shows a demand responsive fish feeder which utilizes a hopper that extends below a water line. Fish adjacent the lower portion of the hopper trigger the release of feed by the movement of a lever or a rod.

An apparatus to transport animal feed which is simple and includes adjustable mixing features would be a notable advance in the field of animal husbandry.

BRIEF SUMMARY OF THE INVENTION

In accordance with the present invention a novel and useful apparatus for transporting animal feed is hereinafter described.

The apparatus of the present invention is used in conjunction with an aqueous body. Such apparatus includes a container having a wall portion forming an open chamber. The wall portion includes at least one aperture therethrough to allow aqueous material to pass from the aqueous body to the chamber of the container. The container may be formed to fit within a structure, such as a deck, and may be movable into the aqueous body by varying degrees.

A baffle is also employed in the present invention to aid in the delivery of the animal feed. The baffle is positioned in the chamber of the container and is positioned to direct animal feed to a selected portion of the chamber. The baffle may be removable and may also include a sliding guide mechanism to adjust the extension of the baffle into the chamber of the container.

A conduit is also utilized in the present invention to guide the animal feed and aqueous material from the chamber of the container to a predetermined place. The conduit would include an opening into the open chamber of the container and is positioned to accept animal feed and aqueous material, which have been thoroughly mixed in the chamber. The opening to the chamber and conduit guiding the animal feed and aqueous material from the chamber pass to a pump which urges the movement of the animal feed and aqueous material to a place remote from the container. The exit of the pump may include another conduit having an end opening which disperse the animal feed and aqueous material for use.

It may be apparent that a novel and useful apparatus for transporting animal feed has been hereinabove described.

It is therefore an object of the present invention to provide an apparatus for transporting animal feed which is simple to manufacture and maintain.

Another object of the present invention is to provide an apparatus for transporting animal feed which employs the water pressure of the aqueous body to mix the animal feed and aqueous material prior to distribution.

Yet another object of the present invention is to provide an apparatus for transporting animal feed which is capable of varying the position of the feed in an open chamber of the container, as well as the pressure and velocity of the aqueous material entering the open chamber, in order to maximize the mixing of the animal feed and the aqueous material prior to distribution.

A further object of the present invention is to provide an apparatus for transporting animal feed which is capable of mixing the animal feed with an aqueous material in a certain area adjacent habitations and to disperse the animal feed in an area remote from the habitations.

The invention possesses other objects and advantages especially as concerns particular characteristics and features thereof which will become apparent as the specification continues.

For a better understanding of the invention reference is made to the following detailed description of the preferred embodiments thereof which should be taken with the prior described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior delineated drawings.

Figure 1:
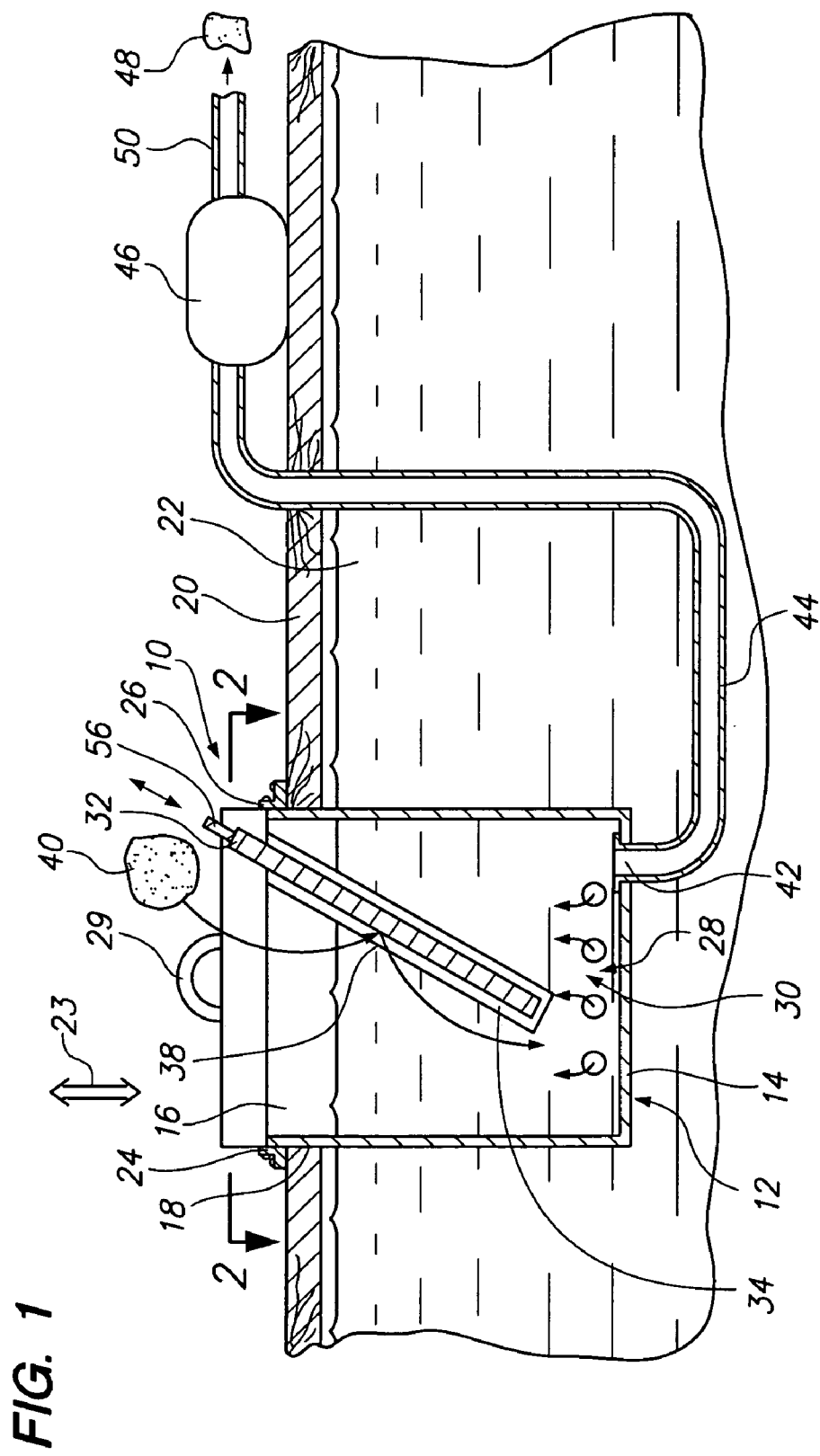
FIG. 1 is a sectional view of the apparatus shown installed on a deck over the surface of a body of water.
Figure 2:
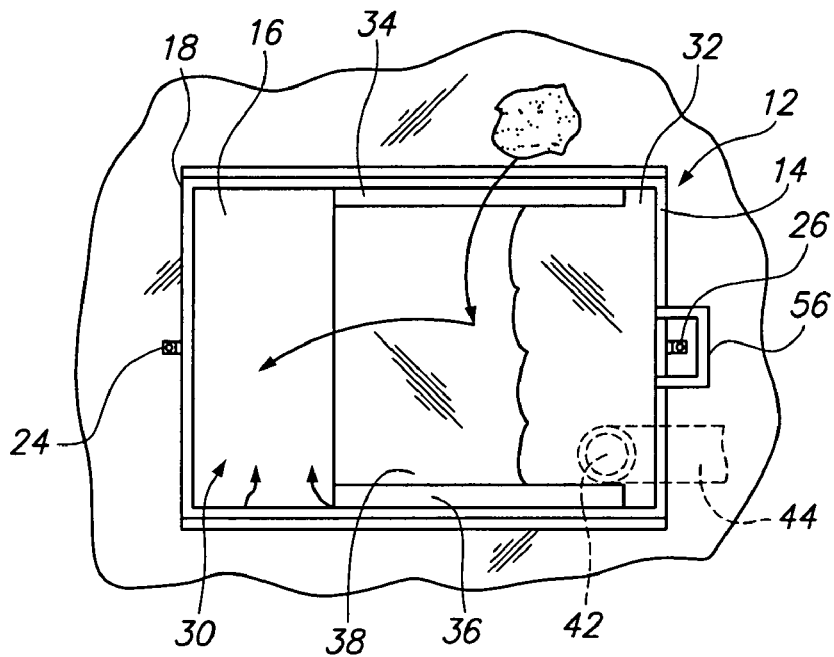
FIG. 2 is a sectional view taken along line 2—2 of FIG. 1, with the movable baffle shown in whole.

The invention as a whole is shown in the drawings by reference character 10. Apparatus 10 includes as one of its elements a container 12. Container 12 includes a wall portion 14 forming an open chamber 16. Container 12 is constructed to fit within an opening 18 of deck 20 which extends over body of water 22. In this regard, container 12 is movable upwardly and downwardly according to directional arrow 23, FIG. 1 and may be fixed in the position shown in FIG. 1 or raised outwardly from body of water 22 as needed. Brackets 24 and 26 permit the fixation of container 12 at a predetermined position and extension into body of water 22, the purpose of which will be described hereinafter. Handles 29 and another not shown, permit the user to lift container 12 outwardly from deck opening 18. A plurality of openings 28 at the lower portion of container 12 permits aqueous material, such as water from water body 22, to enter chamber 16 and fill the same to the level of the body of water 22. Multiplicity of directional arrows 30 from plurality of openings 28 indicate the movement of water into chamber 16.

Apparatus 10 of the present invention is also constructed with a movable baffle 32 which angularly extends into chamber 16 through guides 34 and 36, connected to wall portion 14 of container 12. Baffle 32 includes an upper surface 38 which extends into chamber 18 and the water contained therein. Mass of animal feed 40 is intended to slide or bounce from surface 38 of baffle 32 and into chamber 16 in order to mix with the water entering plurality of apertures 28 under pressure provided by body of water 22.

Exit opening 42 of chamber 16 leads to a flexible conduit 44. Conduit 44 is intended to drain water and animal feed 40 from chamber 16. Conduit 44 leads to a pump 46 which directs water and animal feed mixture 48 via conduit 50 to a desired place. It should be noted that moveable baffle 32 directs animal feed mass 42 to a portion of chamber 16 which lies a selected distance from exit openings 42 in order to ensure thorough mixing of animal feed 40 and water.

Figure 3:
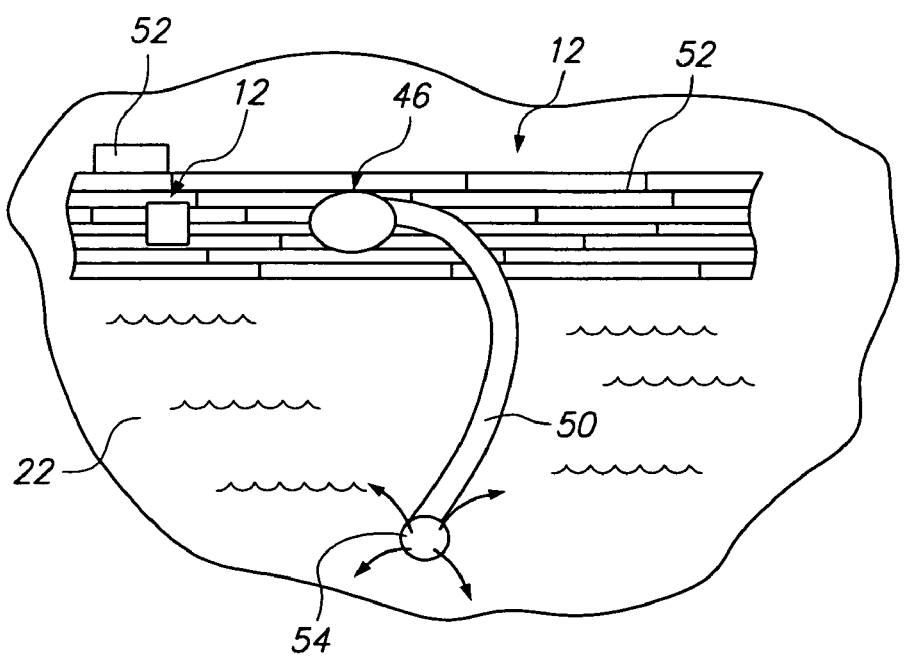
FIG. 3 is a top plan view of the apparatus of the present invention installed in an outdoor setting.

In operation, reference is made to FIG. 3 in which apparatus 10 is shown to be located on deck 20 and adjacent habitation building 52. Feed and water mixture 48 passes through pump 46 and conduit 50 to a distribution exit 54 which may be remotely located from habitation 52. Seed mass 40 is directed against surface 38 of movable baffle 32 which is located in chamber 16 and maneuvered with griping member 56. Water is allowed to enter chamber 16 through plurality of openings 28 and fill chamber 16 to desired level. The level of water within chamber 16 is adjusted by the movement of container 12 according to directional arrow 24. Container 12 is fixed in a particular position by brackets 24 and 26 or by any other suitable means. The seed and water mixture is pulled form chamber 16 by pump 46 through conduit 44 and directed for dispersion via conduit 50 through exit head 54. It has been found, that apparatus 10 is particularly suitable for feeding waterfowl in an aqueous environment.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An apparatus for transporting animal feed in an aqueous body, comprising:
    a. a container, said container having a wall portion forming an open chamber, said wall portion including at least one aperture therethrough to allow aqueous material of the aqueous body to enter said chamber of said container;
    b. a baffle, said baffle positioned in said chamber of said container to direct animal feed to a selected portion of said chamber;
    c. a conduit for guiding the animal feed and aqueous material from said chamber of said container to a predetermined place;
    d. a pump for urging the movement of the animal feed and aqueous material from said chamber of said container and through said conduit; and
    e. a guide for adjusting the extension of said baffle into said chamber of said container.

2. The apparatus of claim 1 in which said guide includes at least one track mounted to said container within said chamber of said container.

3. An apparatus for transporting animal feed in an aqueous body, comprising:
    a. a container, said container having a wall portion forming an open chamber, said wall portion including a plurality of apertures therethrough to allow aqueous material of the aqueous body to enter said chamber of said container;
    b. a baffle, said baffle positioned in said chamber of said container to direct animal feed to a selected portion of said chamber;
    c. a conduit for guiding the animal feed and aqueous material from said chamber of said container to a predetermined place; and
    d. a pump for urging the movement of the animal feed and aqueous material from said chamber of said container and through said conduit.

4. An apparatus for transporting animal feed in an aqueous body, comprising:
    a. a container, said container having a wall portion forming an open chamber, said wall portion including at least one aperture therethrough to allow aqueous material of the aqueous body to enter said chamber of said container;
    b. means for occluding at least a portion of said one aperture;
    c. a baffle, said baffle positioned in said chamber of said container to direct animal feed to a selected portion of said chamber;
    d. a conduit for guiding the animal feed and aqueous material from said chamber of said container to a predetermined place; and
    e. a pump for urging the movement of the animal feed and aqueous material from said chamber of said container and through said conduit.

5. The apparatus of claim 4 which additionally comprises a guide for adjusting the extension of said baffle into said chamber of said container.

6. The apparatus of claim 5 in which said guide includes at least one track mounted to said container within said chamber of said container.

7. The apparatus of claim 4 which further comprises a handle connected to said baffle.

8. The apparatus of claim 4 in which said at least one aperture comprises a plurality of apertures, each of said plurality of apertures passing through said wall portion of said container.

9. The apparatus of claim 4 in which said means for occluding at least a portion of said one aperture comprises a plate and a bracket, said bracket slidingly engaging said plate.

10. The apparatus of claim 9 which further includes means for fixing said bracket to the exterior of said container.

* * * * *